(12) United States Patent
Chen et al.

(10) Patent No.: US 9,191,937 B2
(45) Date of Patent: Nov. 17, 2015

(54) METHODS AND APPARATUS FOR ACCESS, ENABLEMENT AND CONTROL BY DEVICES IN TV WHITE SPACE

(75) Inventors: Hou-Shin Chen, East Brunswick, NJ (US); Wen Gao, West Windsor, NJ (US)

(73) Assignee: Thomson Licensing, Issy les Moulineaux (FR)

( * ) Notice: Subject to any disclaimer, the term of this patent is extended or adjusted under 35 U.S.C. 154(b) by 165 days.

(21) Appl. No.: 13/702,398

(22) PCT Filed: Jun. 22, 2011

(86) PCT No.: PCT/US2011/041325
§ 371 (c)(1),
(2), (4) Date: Dec. 6, 2012

(87) PCT Pub. No.: WO2011/163287
PCT Pub. Date: Dec. 29, 2011

(65) Prior Publication Data
US 2013/0079046 A1 Mar. 28, 2013

Related U.S. Application Data

(60) Provisional application No. 61/398,153, filed on Jun. 22, 2010, provisional application No. 61/398,152, filed on Jun. 22, 2010, provisional application No. 61/399,105, filed on Jul. 7, 2010.

(51) Int. Cl.
*H04W 4/00* (2009.01)
*H04W 72/04* (2009.01)
(Continued)

(52) U.S. Cl.
CPC ............ *H04W 72/042* (2013.01); *H04W 48/10* (2013.01); *H04W 16/14* (2013.01)

(58) Field of Classification Search
CPC ..... H04W 84/08; H04W 28/04; H04W 88/08; H04W 72/044; H04W 72/042; H04W 72/04; H04W 76/02; H04W 28/16; H04W 16/10; H04W 16/14; H04W 48/16; H04W 48/18; H04W 48/20; H04W 48/06; H04W 48/12
USPC .............. 455/418–420, 422.1, 434, 446, 447, 455/450, 454, 550.1, 507, 509
See application file for complete search history.

(56) References Cited

U.S. PATENT DOCUMENTS 6,002,694 A * 12/1999 Yoshizawa et al. ........... 370/486
7,909,255 B2   3/2011 Young
(Continued)

FOREIGN PATENT DOCUMENTS

CN   101578793   11/2009
JP   2013513288   4/2013
(Continued)

OTHER PUBLICATIONS

Sun et al., "11af Draft Amendment Proposal of TV band Multi-band DSE Procedures." IEEE P802.11 Wireless LANs, Doc.: IEEE 802.11-10/0710r0, Jun. 21, 2010, 6 pages.
(Continued)

*Primary Examiner* — Nhan Le
(74) *Attorney, Agent, or Firm* — Robert D. Shedd; Chris Kolefas

(57) ABSTRACT

Methods and apparatus for access, enablement and control of devices in TV white space are provided. Methods and apparatus for channel scanning by a device are provided that shorten channel scanning time by using a 5 MHz Measurement Pilot frame at a predetermined location within an enabling device's channel, regardless of the operating bandwidth of the enabling device. Also provided are methods and apparatus for multi-band dynamic station enablement that locate information regarding an enabling device's supported regulatory classes and channel numbers within one accessible frame of information and also provide request and response messages to arrange for enablement of a requesting device on a network. Further, methods and apparatus are provided for identifying an interfering device on a network by providing increased information from within a DSE Registered Location element.

12 Claims, 12 Drawing Sheets

(51) Int. Cl.
*H04W 48/10* (2009.01)
*H04W 16/14* (2009.01)

(56) References Cited

U.S. PATENT DOCUMENTS

| | | |
|---|---|---|
| 2005/0143082 A1 | 6/2005 | Yang |
| 2007/0121620 A1* | 5/2007 | Yang et al. .................... 370/389 |
| 2009/0143019 A1 | 6/2009 | Shellhammer |
| 2009/0268674 A1 | 10/2009 | Liu et al. |
| 2010/0195580 A1 | 8/2010 | Samarasooriya et al. |
| 2011/0002416 A1 | 1/2011 | Shin et al. |
| 2011/0077042 A1 | 3/2011 | Stanforth et al. |
| 2011/0134852 A1 | 6/2011 | Cordeiro |
| 2011/0299481 A1 | 12/2011 | Kim et al. |

FOREIGN PATENT DOCUMENTS

| | | |
|---|---|---|
| JP | 2013529448 | 7/2013 |
| WO | WO-2010/095791 | 8/2010 |

OTHER PUBLICATIONS

Chen et al., "A Periodic 5 MHz Measurement Pilot for Channel Scan," Doc.: IEEE 802.11-10/0527r0, May 11, 2010, 6 pages.
Chen et al., "Normative Text for 5 MHz Measurement Pilot Frame, IEEE P802.11 Wireless LANs," Doc.: IEEE 80211-10/0828r0, Apr. 27, 2010, 4 pages.
IEEE Standard, "IEEE Standard for Information Technology Telecommunications and Information Exchange Between Systems Local and Metropolitan Area Networks Specific Requirements," IEEE Std. 802-11y-2008, Nov. 6, 2008, 88 pages.
Perahia, "TGy Coexistence Assurance Document," IEEE P802.11 Wireless LANs, Doc.: IEEE 802.11-07/206641, Jul. 6, 2007, 3 pages.
Verma et al: "Wireless Networking in TV White Space Leveraging Wi-Fi", Samsung Electronics, Suwon, Korea, IEEE 14th International Symposioum Symposium on Consumer Electronics.
Reising et al: "Improving Intra-Cellular Security Using Air Monitoring Security Using Air Monitoring with RF-Fingerprints", IEEE Communications Society Pub. @ WCNC 2010 Proceedings.
Search Report dated Jan. 4, 2012.

* cited by examiner

| Category | Action Value | Beaconfields |
|---|---|---|

Octets: 1     1     variable

*FIG. 2*

Public Action field values

| Action field value | Description |
|---|---|
| 0 | Reserved |
| 1 | DSE enablement |
| 2 | DSE deenablement |
| 3 | DSE Registered Location Announcement |
| 4 | Extended Channel Switch Announcement |
| 5 | DSE measurement request |
| 6 | DSE measurement report |
| 7 | Measurement Pilot |
| 8 | DSE power constraint |
| <u>9</u> | <u>5-MHz Measurement Pilot</u> |
| 10 - 255 | Reserved |

*FIG. 3*

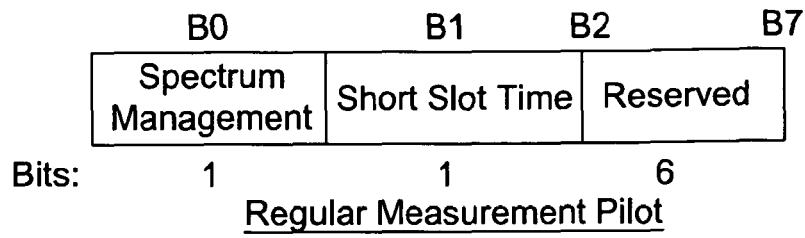
FIG. 4A
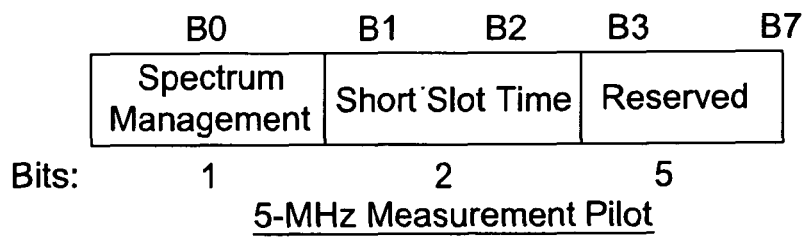
FIG. 4B
| (B1, B2) | (aSlotTime, aSIFSTime) |
|---|---|
| (0, 0) | (21 μs, 64 μs) |
| (0, 1) | (13 μs, 32 μs) |
| (1, 0) | (9 μs, 16 μs) |
| (1, 1) | Reserved |
FIG. 5

FIG. 6

| Action field value | Description |
|---|---|
| 0 | Reserved |
| 1 | DSE enablement |
| 2 | DSE deenablement |
| 3 | DSE Registered Location Announcement |
| 4 | Extended Channel Switch Announcement |
| 5 | DSE measurement request |
| 6 | DSE measurement report |
| 7 | Measurement Pilot |
| 8 | DSE power constraint |
| 9 | 5-MHz Measurement Pilot |
| 10 | Multi-band DSE enablement request |
| 11 | Multi-band DSE enablement response |
| 12 - 255 | Reserved |

FIG. 8

| Category | Action Value | RequesterSTA Address | Length | Current Regulatory Class | list of Regulatory Class(es) |
|---|---|---|---|---|---|
| Octets: 1 | 1 | 6 | 1 | 1 | Length - 1 |

FIG. 9

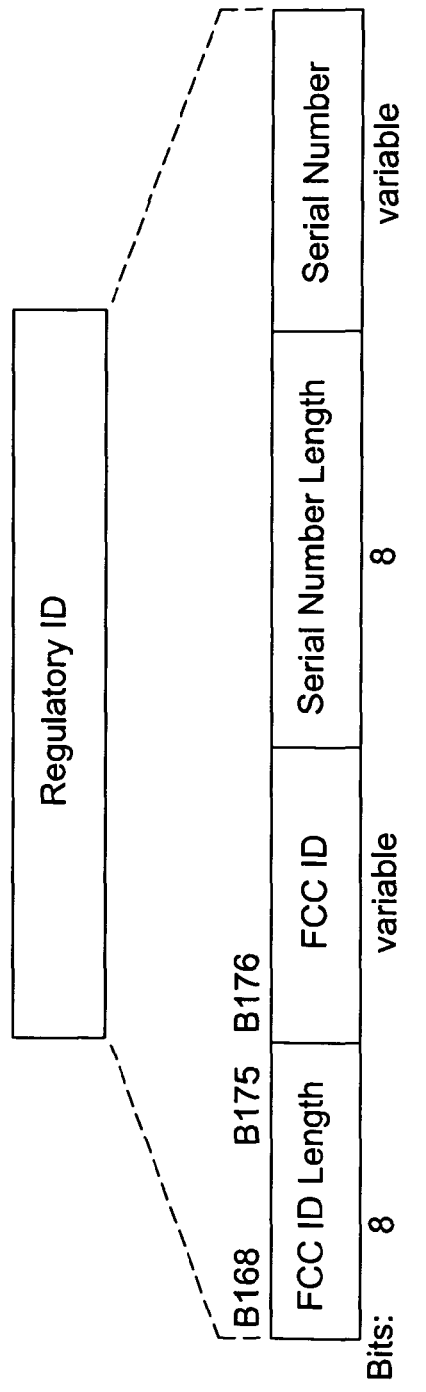

METHODS AND APPARATUS FOR ACCESS, ENABLEMENT AND CONTROL BY DEVICES IN TV WHITE SPACE

CROSS-REFERENCE TO RELATED APPLICATIONS

This application is a National Stage Application and claims the benefit, under 35 U.S.C. §365 of International Application PCT/US2011/041325 filed Jun. 22, 2011 which was published in accordance with PCT Article 21(2) on Dec. 29, 2011 in English and which claims the benefit of U.S. Provisional Patent Application No. 61/398,153 filed on Jun. 22, 2010, U.S. Provisional Patent Application No. 61/398,152 filed on Jun. 22, 2010 and U.S. Provisional Patent Application No. 61/399,105 filed on Jul. 7, 2010

FIELD OF THE INVENTION

The present principles relate to methods and apparatus for network access, enablement, and control of devices in TV white space.

BACKGROUND OF THE INVENTION

Recently, the Federal Communications Commission (FCC) has approved the operation of unlicensed radio transmitters in the broadcast television spectrum at locations where that spectrum is not being used by licensed services, such as television stations and wireless microphone operators, under certain rules. This unused TV spectrum is often termed "white space". A concept called Cognitive Radio was proposed to implement negotiated, or opportunistic, spectrum sharing to improve spectrum efficiency for these frequencies.

It can be expected that the implementation of Cognitive Radio (CR) in TV white space will be a major topic within wireless communication into the future and provide a viable solution to the problem of scarcity of the wireless spectrum. In 2004, based on the expectation of unlicensed use of TV white space, under the charter of an IEEE 802 Standards Committee, a working group named IEEE 802.22 was established to develop a standard for a Cognitive Radio-based PHY/MAC/air interface for use by license-exempt devices on a non-interfering basis in spectrum that has already been allocated to the TV Broadcast Service. The IEEE 802.22 working group is also called the WRAN Group, since it is essentially developing an air interface for a Wireless Regional Area Network (WRAN) with a range as large as 30 miles.

An alternate idea is to standardize the use of this spectrum to provide services similar to that of the traditional IEEE 802.11 WiFi standard. This effort to use TV white space for WiFi access is known as 802.11af. The difference between the traditional 802.11 standards and 802.11 of is that 802.11 of will be for WiFi operation in the TV white spaces.

TV white space (TVWS) consists of fragments of TV channels. Thus, depending on the usage of TV broadcasting and wireless microphones, the spectrum opportunity may be 6 MHz, 12 MHz, 18 MHz, . . . assuming that a TV channel is 6 MHz wide. In addition, the spectrum opportunity may happen in any of the TV bands. Thus, the spectrum opportunity in TVWS differs from the traditional 802.11 bands of 2.4 GHz, 3.6 GHz and 5 GHz in that the center frequency and channel bandwidth are variable.

Due to the combinations of bandwidths in TVWS, and variable center frequencies, the channel access delay and the complexity in finding available bandwidth can be large. In addition, as part of the process to find available bandwidth, unlicensed 802.11 devices wishing to operate as dependent stations are subject to channel permissioning and regulatory controls. Once transmitting, these unlicensed devices need to be identifiable to a database administrator in case they cause interference to other authorized devices.

SUMMARY OF THE INVENTION

The channel access, enablement, and control of stations operating in TV white space are addressed by the present principles, which are directed to methods and apparatus for access, enablement and control of devices in TV white space. Using the principles described herein, access to the TV white space medium is provided with lower channel scan times by utilizing fast passive scanning of a Measurement Pilot Frame of 5 MHz bandwidth, regardless of whether the operating channel bandwidth is 5 MHz, 10 MHz, or 20 MHz. Permission to operate over multiple bands is enabled under the present principles by employing multi-band dynamic station enablement (DSE) and two new information frames. In addition, increased station identification information is provided under the present principles to identify interfering devices within a network.

According to one aspect of the present principles, there is provided a method for channel scanning by a device that shortens the scanning time by using a 5 MHz Measurement Pilot frame at a predetermined location within an enabling device's channel, regardless of the operating bandwidth of the enabling device.

According to another aspect of the present principles, there is provided a method for channel scanning by an enabling device within a network that transmits a 5 MHz Measurement Pilot frame at a predetermined location within its channel, regardless of its operating bandwidth.

According to another aspect of the present principles, there is provided a method for multi-band dynamic station enablement that transmits information regarding an enabling device's supported regulatory classes and channel numbers within one accessible frame of information and also provides request and response messages to arrange for enablement of a requesting device on a network.

According to another aspect of the present principles, there is provided a method for multi-band dynamic station enablement by an enabling device on a network. The method transmits information regarding an enabling device's supported regulatory classes and channel numbers within one accessible frame of information and also exchanges request and response messages to arrange for enablement of a requesting device on a network.

According to another aspect of the present principles, there is provided a method for increased information from within a DSE Registered Location element to be used for improved identification of interfering devices on a network.

According to another aspect of the present principles, there is provided an apparatus for channel scanning by a device that shortens the scanning time by using a 5 MHz Measurement Pilot frame at a predetermined location within an enabling device's channel, regardless of the operating bandwidth of the enabling device.

According to another aspect of the present principles, there is provided an apparatus for channel scanning by an enabling device within a network that transmits a 5 MHz Measurement Pilot frame at a predetermined location within its channel, regardless of its operating bandwidth.

According to another aspect of the present principles, there is provided an apparatus for multi-band dynamic station enablement that transmits information regarding an enabling device's supported regulatory classes and channel numbers within one accessible frame of information and also provides request and response messages to arrange for enablement of a requesting device on a network.

According to another aspect of the present principles, there is provided an apparatus for multi-band dynamic station enablement of a requesting device on a network. The apparatus transmits information regarding an enabling device's supported regulatory classes and channel numbers within one accessible frame of information and also exchanges request and response messages with a device seeking to become enabled to arrange for enablement of that requesting device on a network.

According to another aspect of the present principles, there is provided an apparatus for increased information from within a DSE Registered Location element to be used for improved identification of interfering devices on a network.

These and other aspects, features and advantages of the present principles will become apparent from the following detailed description of exemplary embodiments, which are to be read in connection with the accompanying drawings.

BRIEF DESCRIPTION OF THE DRAWINGS

FIG. 2 shows the format of one type of 802.11 Management Frame, the Beacon frame.

FIG. 3 shows a list of the Public Action field values under the present principles.

FIG. 4a shows the Condensed Capability Information field of a regular Measurement Pilot frame. FIG. 4b shows the Condensed Capability Information when using a 5 MHz Measurement Pilot frame under the present principles.

FIG. 5 shows a Slot Time subfield.

FIG. 6 shows the format of the DSE Registered Location element under the present principles.

FIG. 8 shows a further example of Public Action field values that are used in an 802.11 Management frame under the present principles.

FIG. 9 shows the format of a multi-band DSE request frame under the present principles.

FIG. 10 shows the format of the multi-band DSE response frame under the present principles.

FIG. 11 shows the format of the Regulatory ID field of the DSE Registered Location element of an 802.11 Management frame.

DETAILED DESCRIPTION

Recently, based on the approval of the FCC, unlicensed radio transmitters can utilize the broadcast television spectrum at locations where that spectrum is not being used by licensed services, according to IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications," IEEE, New York, N.Y., June 2007. This unused TV spectrum is often termed "TV white space". The charter of the IEEE 802.22 working group is to develop a standard for a cognitive radio-based PHY/MAC/air interface for use by license-exempt devices on a non-interfering basis in spectrum that is allocated to the TV Broadcast Service. Another group, the 802.11 of group, is standardizing the use of TV white spaces for services traditionally provided by the 802.11 WLAN standard. The IEEE 802.11 af group is significant because there are already a tremendous number of 802.11 devices in the market. Under the principles described herein, we describe approaches for TV white space devices, also known as TV band devices (TVBD), acting as dependent stations (STA), to access and gain permission to operate in the TV white space spectrum, over a number of different bandwidths, and to be identified should they cause interference to other devices.

The fundamental access method of the IEEE 802.11 Medium Access Control (MAC) is a Distributed Coordination Function (DCF) known as Carrier Sense Multiple Access with Collision Avoidance (CSMA/CA). It is a distributed system while most of other systems such as IEEE 802.16 and IEEE 802.22 are centralized systems. The 802.11 af group uses a DCF access function for its MAC layer.

Figure 1:
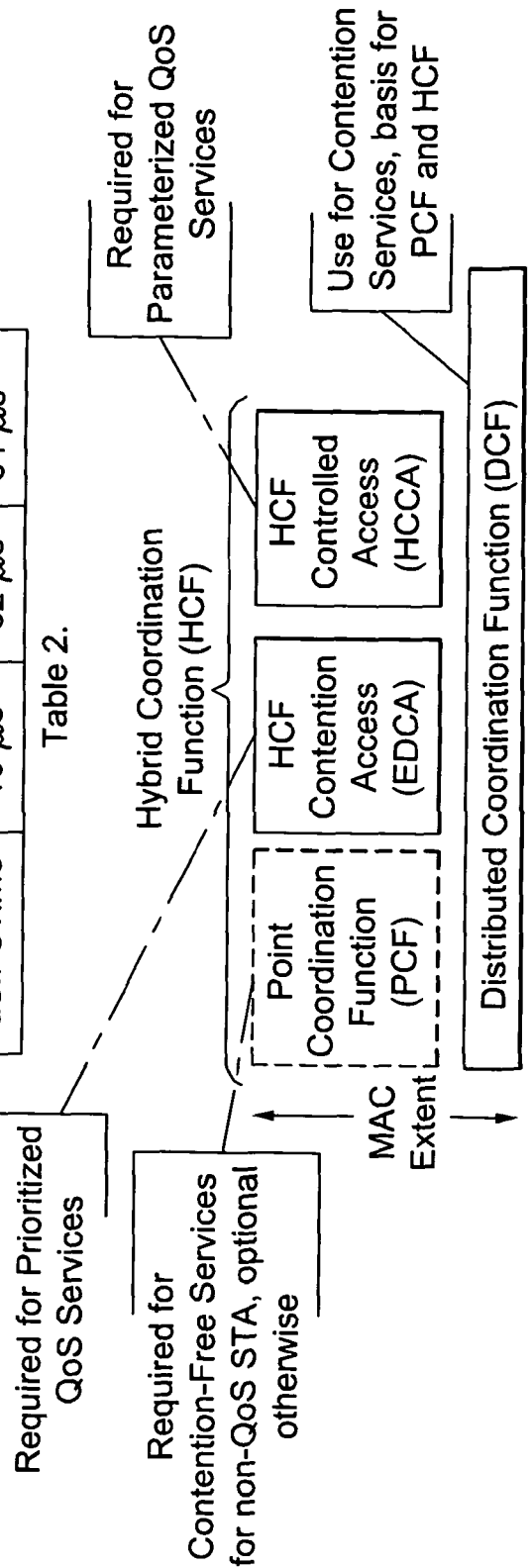
FIG. 1 shows the IEEE 802.11 Medium Access Control (MAC) architecture.

The basic 802.11 MAC layer employs Distributed Coordination Function (DCF) with enhanced distributed channel access (EDCA) mechanism to compete for wireless medium. FIG. 1 (from IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications," IEEE, New York, N.Y., June 2007) illustrates the IEEE 802.11 MAC architecture. The basic MAC rule is that DCF and Hybrid Coordination Function (HCF) are provided through the services of the DCF to support Quality of Service (QoS). The Point Coordination Function (PCF) is a centralized mechanism and it is seldom used. The HCF uses both a contention-based channel access method, called the EDCA mechanism for contention-based transfer, and a controlled channel access, referred to as the HCF controlled channel access (HCCA) mechanism, for contention-free transfer.

The EDCA mechanism provides differentiated, distributed access to the wireless media for stations (STAB) using eight different user priorities (UPs). It defines four access categories (ACs) that provide support for the delivery of traffic with UPs at the STAB. The four ACs and their corresponding parameters are listed in Table 1 (from IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications). In Table 1, TXOP refers to transmission opportunity. It is the time that a station has the right to transmit on the channel, limited by TXOPLimit. An initiation of the TXOP occurs when a STA obtains access to the medium through DCF. Multiple frames may be transmitted in an acquired TXOP if there is more than one frame pending in the AC for which the channel has been acquired. However, those frames that are pending in other ACs shall not be transmitted in this TXOP.

Based on the FCC Second Report and Order of November 2008, TV channels 2-51 except channels 3, 4 and 37, can be used for radio transmissions provided that the incumbent licensed signals, i.e., TV broadcast and wireless microphone (WM) signals, are not interfered. Thus, the spectrum opportunity in TVWS consists of fragments of single or multiple TV channels (TVCs). The size of the each fragment can vary from 1 TVC to several TVCs. It has been shown that even in urban areas, a fragment can have as many as four contiguous TVCs. In rural areas, fragments of up to 16 TVCs are possible. Basically, more channel bandwidth means higher data rate and smaller data packet sizes. Having a small data frame is important for a CSMA system.

The spectrum opportunities in TVWS can be classified into two categories, which are contiguous and non-contiguous.

In the first case, the available TVCs are contiguous. TV White Space devices may employ 5 MHz, 10 MHz, or 20 MHz bandwidths corresponding to 1, 2, and 4 contiguous available TV channels. Ideally, the larger the channel bandwidth, the higher the data rate. From this point of view, a system should use four contiguous TVCs as often as possible. Practically, this is not always possible if four contiguous channels are not available. In the second case, the available TVCs are non-contiguous. When the available TVCs are not contiguous but within one TVC of each other, we still want to use them together to increase data rate and have small packet sizes.

When a device wants to communicate with other devices within a network, it needs to become enabled so that it is allowed to transmit and receive with the permission of the enabling device, even though it may be transferring data with a different device. Under the principles presented herein, in order to shorten the channel scan time of a device attempting to become enabled within a network, a narrowband Measurement Pilot frame is transmitted by an Access Point (AP) within the network. This Measurement Pilot frame is transmitted periodically by the Access Point at a smaller interval than a Beacon Interval. Beacon Frames are a type of Management Frame within the 802.11 MAC protocol. An example of a Management Frame is shown in FIG. 2, where the Category field indicates whether the frame is a public frame or a radio measurement frame. The Action Value can take one of several values to indicate the purpose of the frame, such as a Beacon frame. Beacon frames are sent periodically by Access Points to broadcast the Access Point's presence. The frames contain information pertaining to the Access Point, such as Service Set Identifier, Timestamp, supported rates for a wireless LAN, and Beacon interval. Stations continually scan 802.11 channels to pick up Beacon frame signals from Access Points within their range to decide the Access Point to which they should associate. They may also monitor the channel for Measurement Pilot frames to obtain some of the same information as in a Beacon signal, but at a more frequent interval. Once a device is enabled, it is then described as being dependent upon the Access Point that enables it, which is called an Enabling AP.

The Measurement Pilot Frames are transmitted by Access Points more frequently than Beacon frames. The Measurement Pilot Frames are defined in the IEEE 802.11k standard and comprise just some of the information contained within a Beacon frame and, for that reason, are smaller in size. They assist stations with fast passive channel scanning. Under the present principles, the Measurement Pilot Frames have a fixed channel bandwidth of 5 MHz, in a location that is known a priori to both Access Points and devices seeking to become enabled. The Measurement Pilot Frames are transmitted in this predetermined 5 MHz portion of the channel regardless of the operating bandwidth of the AP that transmits it. This shortens the channel access time compared to Measurement Pilot Frames transmitted over a 10 MHz, 20 MHz, or 40 MHz bandwidth. This is because with larger operating bandwidths, a Measurement Pilot could be located at a number of center frequencies. Under the present principles, a station looking to become a dependent STA only needs to search a particular 5 MHz portion of spectrum regardless of the channel bandwidth to find the Measurement Pilot Frame.

FIG. 3 shows a field from an 802.11 Public Action frame that includes a value for a 5 MHz Measurement Pilot under the present principles. A Public Action frame is one type of 802.11 Management Frame. FIG. 4a shows an example format of the Measurement Pilot Frame's Condensed Capability Information Field when a Measurement Pilot frame, as defined in IEEE 802.11k with an unrestricted bandwidth, is used. FIG. 4b shows the Measurement Pilot Frame's Condensed Capability Information Field when a narrowband, or 5 MHz, Measurement Pilot Frame is used under the present principles. In this case, the Slot Time subfield consists of two bits carrying slot time information. The corresponding slot times for 5, 10, and 20/40 MHz channel spacing (from top to bottom) as defined in the OFDM MAC layer are listed in FIG. 5.

The parameter aSlotTime defines a time interval, a multiple of which a transmitting device waits before transmitting frames of data when operating within a network. The parameter aSIFSTime defines a short interframe space time, during which a receiver must send an acknowledge signal back to a transmitter. According to Table 2 (from IEEE Standard for Information Technology-Telecommunications and Information Exchange Between Systems-Local and Metropolitan Area Networks-Specific Requirements—Part 11: Wireless LAN Medium Access Control (MAC) and Physical Layer (PHY) Specifications), aSlotTime and ASIFSTime are different for different channel bandwidths. Devices can set their own aSlotTime and aSIFSTime to these values when joining a network depending on their own operating bandwidths.

802.11 WLAN devices (or stations, STAB) operate in the 2.4 GHz, 5 GHz and US 3650 MHz bands, but can also operate in TVWS as secondary users. The US 3650 MHz band is a licensed band, and because many 802.11 devices have multi-band capability, some may operate in both licensed and unlicensed bands. A device may connect with an Access Point in an unlicensed band and then attempt to switch to a licensed band. Any 802.11 devices must receive permission and are subject to regulatory control to operate as dependent stations within TVWS or within a licensed band. The 802.11 devices use dependent station enablement (DSE) procedures to periodically receive permission and have permission rescinded from them by an enabling station. DSE procedures are specified in IEEE 802.11y-2008. The enablement signals are not required to be sent within the same band that a device is operating. For example, DSE may be performed in the 2.4 GHz band and the TVWS spectrum may be the operating band for a dependent 802.11 device. Therefore, under the present principles, the DSE protocol is extended to support multi-band enablement by allowing the DSE Registered Location element to include information of regulatory class and channel numbers supported by an enabling STA. This allows an enabling STA to give or deny permission to a dependent STA across a number of bands and available channels at once, using the DSE Registered Location element.

Figure 6:
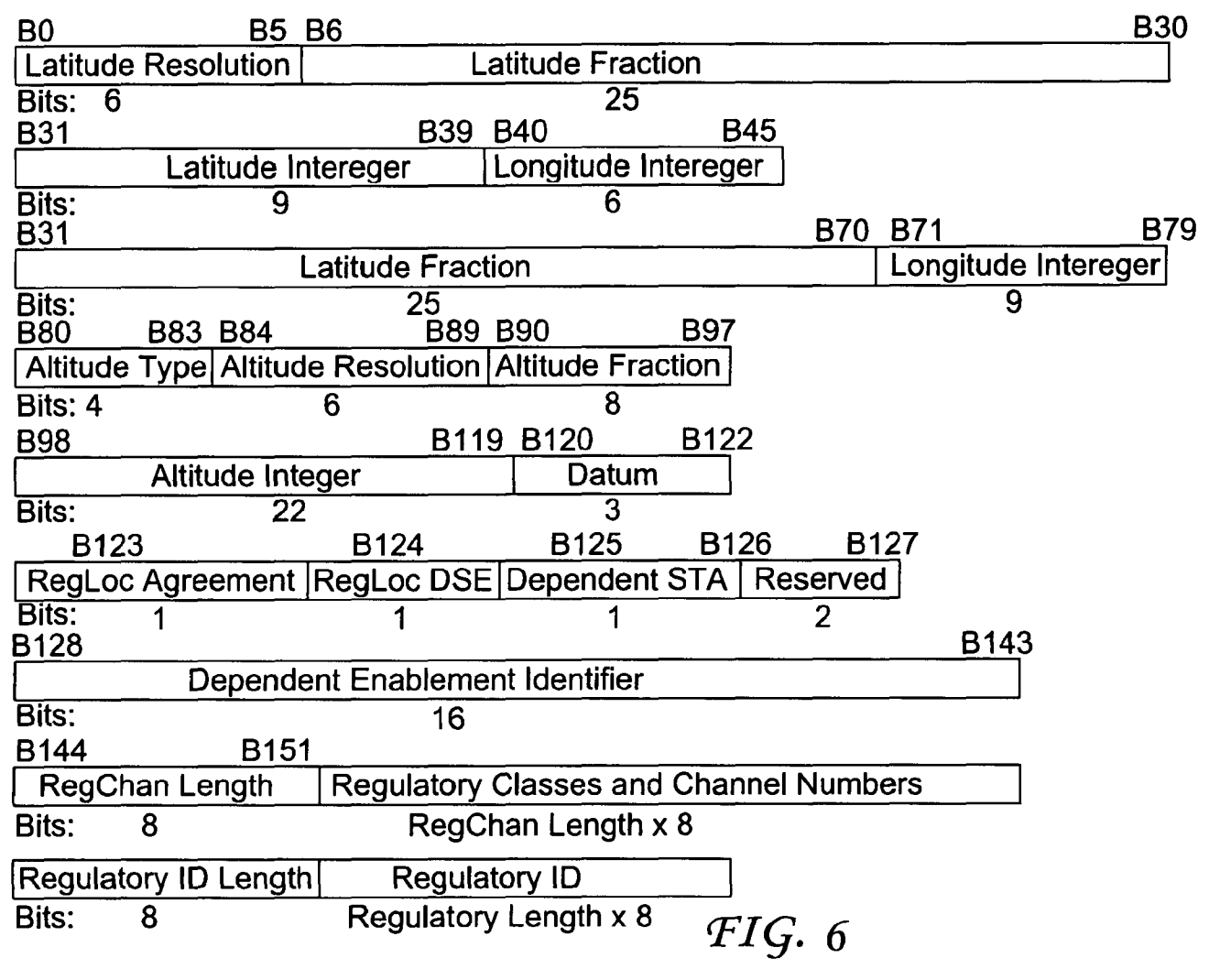
Figure 7:
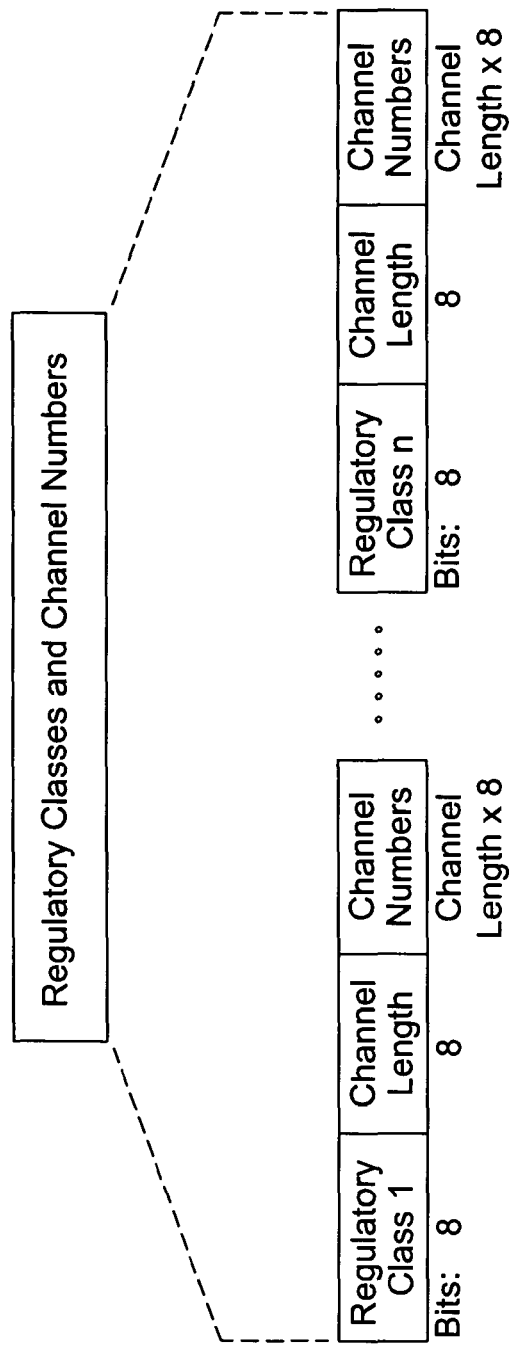
FIG. 7 shows an example of the Regulatory Classes and Channel Numbers field under the present principles.

FIG. 6 shows a DSE Registered Location element using one embodiment of the present principles, which is the addition of fields for Regulatory classes and Channel Numbers, along with a field indicating its length. FIG. 7 shows an example of the Regulatory Classes and Channel Numbers fields. In this example, a subfield indicates a particular regulatory class, followed by an associated Channel Length subfield, and an associated Channel Numbers subfield. Each additionally supported Regulatory Class follows the first Regulatory Class subfields and contains similar subfields. For each class, the Channel Length subfield indicates the number of channels which are supported by the enabling STA. The Channel Numbers subfield lists all of the channel numbers supported by the enabling STA in the Regulatory Class.

Also under the present principles, two Public Action frames are added for the multi-band enablement procedure. These two Public Action frames are for Multi-band DSE request and Multi-band DSE response. FIG. 8 shows an example of the values within a field of the 802.11 Public Action frame previously shown in FIG. 3, but with the addition of values indicative of Multi-band DSE request and Multi-band DSE response.

FIGS. 9 and 10 show examples of what is included in the Multi-band DSE request frame and Multi-band DSE response frame format. Multi-band enablement is carried out by an enablement requester STA transmitting a Multi-band DSE request frame that comprises the requester STA MAC address, and supported regulatory classes. Upon receipt of a Public Action Multi-band DSE Request frame, a responding enabling STA may enable the requesting STA by transmitting a Multi-band DSE response frame comprising the requesting STA's MAC address, the enabling STA's MAC address, the result of the requested enablement, an enablement identifier and the regulatory class and channel number that the enabled STA will use.

Once operating, TV white space devices must be identifiable in order to resolve issues of interference with other devices. DSE STA identification will be used to resolve some interference issues by having dependent STAB broadcast the location of the STA that has enabled them, as well as a unique code. In this way, a victim of the interference can identify and notify a party responsible for correcting the interference, but the privacy of the dependent STA's operator is maintained. The information contained in the DSE Registered Location element includes the latitude, longitude, and altitude of the enabling STA along with a unique code. Under the present principles, the FCC ID and manufacturer's serial number of the device causing interference are also included within a Regulatory ID subfield in the DSE Registered Location element to further identify the responsible operator. The DSE Registered Location element is one type of Action Frame within the 802.11 standard. FIG. 11 illustrates an example of the format of the Regulatory ID subfield, showing the FCC ID and Manufacturer serial number fields, along with length fields to indicate their respective lengths.

Figure 12A:
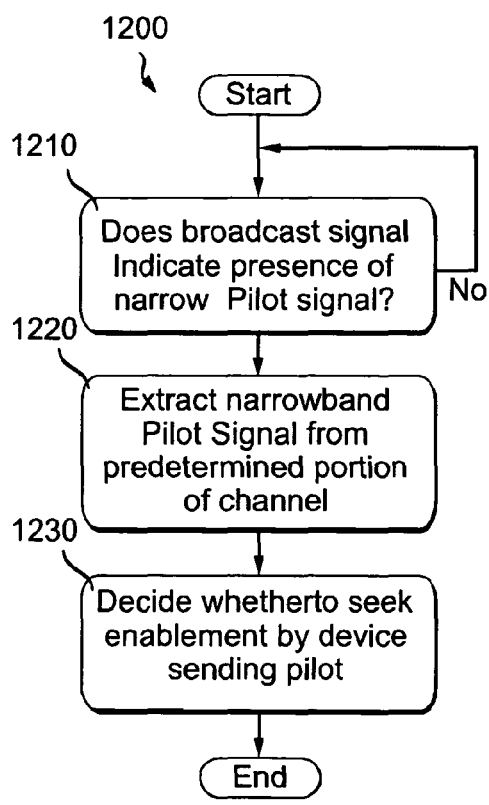
FIGS. 12 (a) and (b) show embodiments of methods for channel scanning under the present principles performed by a device seeking access to a network, and by a device that can authorize access, respectively.

An embodiment of a method 1200 for channel scanning is shown in FIG. 12(a). A frame, such as a Public Action frame for example, is received by a device on a channel in a network and a determination is made in step 1210 whether a value in the frame indicates that a narrowband pilot signal is being sent by an Access Point within the network. If the frame value indicates the presence of a narrowband pilot signal, in step 1220, the pilot signal is extracted from a predetermined narrowband portion of the spectrum. The particular narrowband portion of the spectrum is known a priori by devices, for example, according to a standard. If the frame value indicates that a narrowband pilot signal is not present, the method returns to waiting to receive another Public Action frame. In step 1230, information within the pilot signal, such as utilization or power level, of the Access Point, for example, is used to make a determination whether to send a request for enablement to the device sending the pilot signal. This determination is made by the device seeking enablement based on, for example, whether its throughput will be sufficient given the utilization level information of the Access Point, as received in the pilot signal, or an indication in the pilot signal that will lead a device seeking enablement to either request enablement on the first Access Point or seek another Access Point for enablement in order to maximize the throughput of all traffic on the network.

Figure 12B:
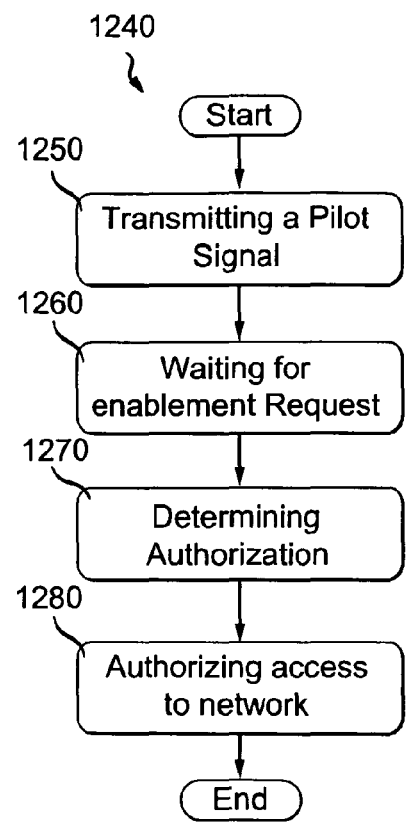

FIG. 12 (b) shows an embodiment of a method 1240 for channel scanning which occurs at the device sending the pilot signal, such as an Access Point. The narrowband pilot is transmitted in step 1250. The Access Point then waits for an enablement request in step 1260. After receiving the enablement request, in step 1270, the Access Point determines whether authorization should be given to the device seeking enablement on the network. In step 1280, the Access Point can authorize the device seeking enablement for access to the network.

Figure 13A:
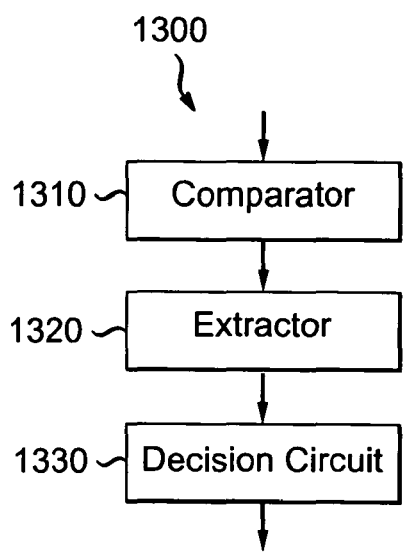
FIGS. 13 (a) and (b) show embodiments of apparatus for channel scanning under the present principles for a device seeking access to a network, and by a device that can authorize access, respectively.

An embodiment of an apparatus 1300 for channel scanning is shown in FIG. 13(a). The apparatus is comprised of a comparator 1310, which determines if a value in a received frame indicates the presence of a narrowband pilot signal. If so, extractor 1320, whose input is in signal communication with the output of comparator 1310, finds the pilot signal within a predetermined narrowband portion of the channel spectrum, regardless of the operating bandwidth of the device sending the pilot signal. The output of extractor 1320 is in signal communication with the input of decision circuit 1330. Decision circuit 1330 determines whether a request for enablement should be sent to the device sending the pilot signal, based on information, such as utilization levels or power levels of the Access Point, extracted from the pilot signal by extractor 1320.

Figure 13B:
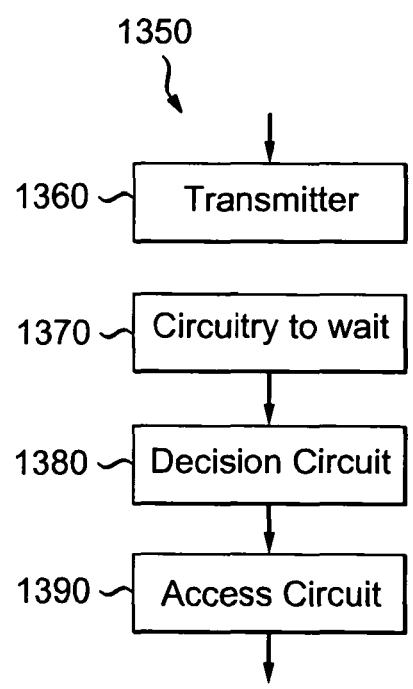

FIG. 13(b) shows an embodiment of an apparatus 1350 for channel scanning. Transmitter 1360 sends a narrowband pilot signal to devices trying to gain access to a network. Circuitry 1370 waits for a request from a device seeking enablement on the network. The output of circuitry 1370 is in signal communication with the input of decision circuit 1380, that determines whether authorization for enablement on the network should be given to the device seeking enablement. Since an Access Point uses 802.11 DSE procedures to periodically grant and rescind permission to dependent devices on the network, the determination made by decision circuit 1380 is based on whether the enabling device has sufficient resources to maintain control and permissioning to the device seeking enablement. The output of decision circuit 1380 is in signal communication with the input of access circuit 1390 that can authorize the device for access to the network.

Figure 14A:
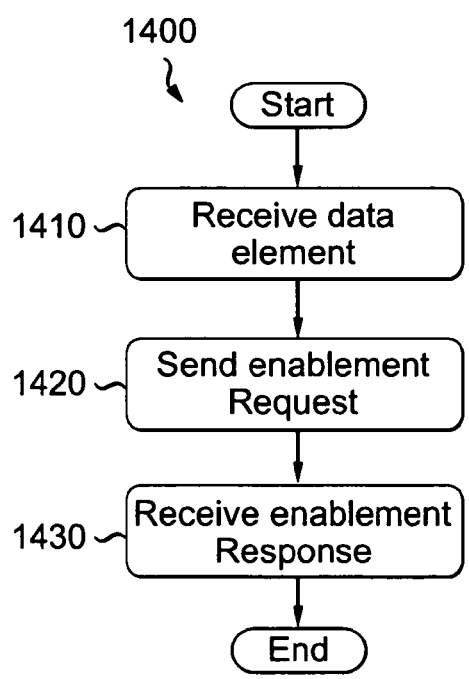
FIGS. 14 (a) and (b) show embodiments of methods for multi-band dynamic station enablement under the present principles performed by a device seeking enablement to a network, and by a device that can authorize enablement on a network, respectively.

An embodiment of a method 1400 for multi-band dynamic station enablement by a device seeking to become enabled on a network under the present principles is shown in FIG. 14a.

The method begins in step 1410 by receiving a data element, such as an 802.11 Management frame containing channel information supported by a potential enabling device. Next, an enablement request is sent by the device seeking enablement in step 1420 using the received channel information from step 1410. In response, an enablement response is received in step 1430 from a device, such as an Access Point, that can authorize enablement on a network.

Figure 14B:
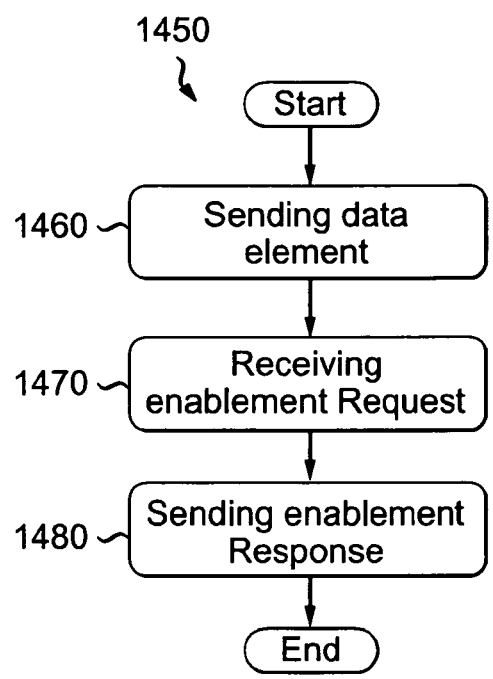

An embodiment of a method 1450 for multi-band dynamic station enablement by an enabling device, such as an Access Point, under the present principles is shown in FIG. 14*b*. The method begins in step 1460 when a data element is sent by the enabling device to any devices seeking to become enabled on the network. The data element comprises channel information that is supported by the enabling device. Based on this information within the data element, a device seeking to become enabled may send an enablement request, and in step 1470, the enabling device receives this enablement request. If the enabling device determines, based on information, for example, on its utilization levels and resources available, it can send an enablement response to the devices seeking to become enabled, in step 1480.

Figure 15A:
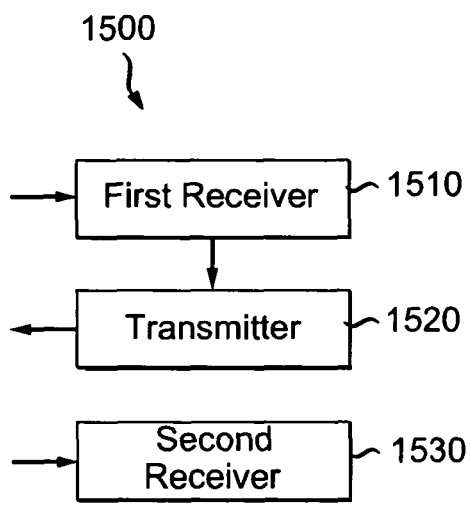
FIGS. 15 (a) and (b) show embodiments of apparatus for multi-band dynamic station enablement under the present principles for a device seeking enablement to a network, and by a device that can authorize enablement on a network, respectively.

An embodiment of an apparatus 1500 for multi-band dynamic station enablement by a device seeking to become enabled in a network under the present principles is shown in FIG. 15*a*. The apparatus comprises a first receiver 1510 for receiving a data element over a network that comprises channel information supported by a device, such as an Access Point, for example, that can enable other network devices. The output of receiver 1510 is in signal communication with transmitter 1520 that sends an enablement request to another station on the network to request enablement. A second receiver 1530 receives an enablement response from a requested device, such as the Access Point, on the network indicating whether enablement has been allowed.

Figure 15B:
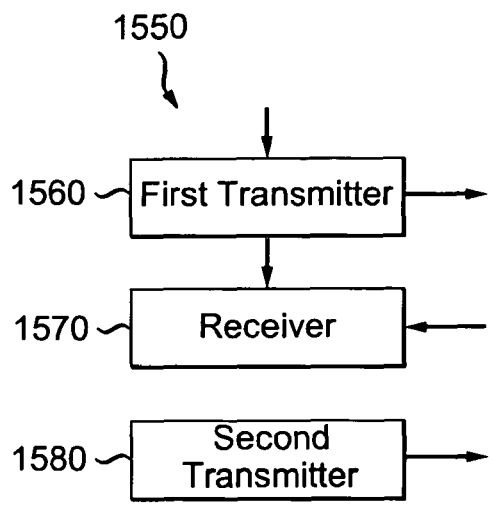

An embodiment of an apparatus 1550 for multi-band dynamic station enablement by an enabling device in a network under the present principles is shown in FIG. 15*b*. The apparatus comprises a first transmitter 1560 for sending a data element capable of being received by a device seeking to become enabled on the network, comprising channel information supported by the enabling device. The output of first transmitter 1560 is in signal communication with a receiver 1570 that receives an enablement request from a device seeking to become enabled if that device determines that the channel information sent from the enabling device matches its needs. A second transmitter 1580 sends an enablement response to the device seeking to become enabled indicating whether enablement has been allowed on the network.

Figure 16:
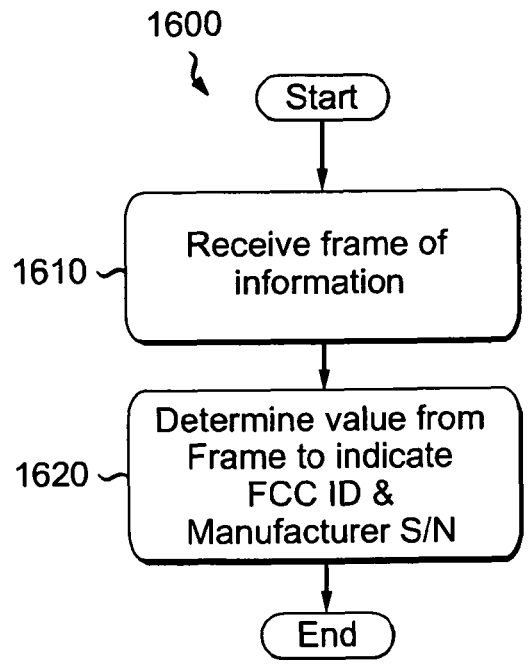
FIG. 16 shows an embodiment of a method for identifying an interfering TV white space device under the present principles.

An embodiment of a method 1600 for identifying a dependent TV white space device causing interference in a network is shown in FIG. 16. The method begins by receiving a frame of information, such as the DSE Registered Location Announcement containing a DSE Registered Location element, for example, in step 1610. From this frame of information, values can be determined, in step 1620, that indicate the FCC ID and manufacturer's serial number of a device that may be causing interference. When a third-party licensed device is being interfered, it needs a way to determine what device is causing the interference. The information transmitted within the DSE Registered Location element is used to track the interfering device. If the interfering device does not stop transmissions, its enabling Access Point is required to rescind permission to operate within the network.

Figure 17:
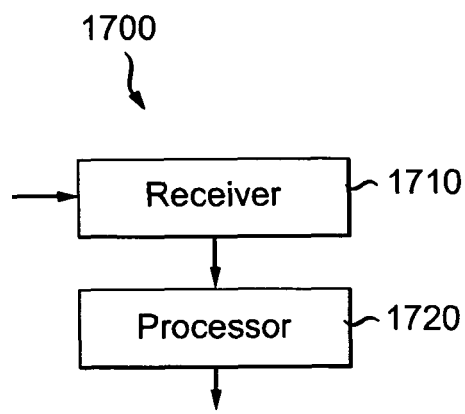
FIG. 17 shows an embodiment of an apparatus for identifying an interfering TV white space device under the present principles.

An embodiment of an apparatus 1700 for identifying a dependent TV white space device causing interference in a network is shown in FIG. 17. A receiver 1710 is used to retrieve a frame of information, such as a DSE Registered Location element, for example, that contains information indicative of the FCC ID and Manufacturer serial number of a device that is causing interference in a network. The output of receiver 1710 is in signal communication with the input of processor 1720 that uses the FCC ID and Manufacturer serial number to identify the interfering device.

One or more embodiments have been described for channel scanning by a device in TV white space. The embodiments provide efficient passive channel scanning by searching a predetermined 5 MHz portion of a channel's spectrum for a Measurement Pilot frame signal, which is sent more frequently than a Beacon signal. The predetermined 5 MHz portion of spectrum is known a priori to Access Points and devices seeking enablement on a network.

Also provided under the present principles are various embodiments for multi-band dynamic station enablement in a network. These embodiments allow the regulatory classes and channel numbers that are supported by an enabling device to be found within a DSE Registered Location element, and provide multi-band DSE request and multi-band DSE response messages to be exchanged. A further embodiment allows the channels where the response and request messages are exchanged to be different than the channel where enabled operation will occur.

Further, under the present principles, one or more embodiments have been provided for identifying an interfering dependent TV white space device. Information included in a frame of information, such as, for example, the DSE Registered Location element, is used to identify the FCC ID and manufacturer's serial number of an interfering device.

We thus provide one or more implementations having particular features and aspects. However, features and aspects of described implementations may also be adapted for other implementations. For example, these implementations and features may be used in the context of other wireless networks or systems. The implementations and features need not be used in a standard.

Reference in the specification to "one embodiment" or "an embodiment" or "one implementation" or "an implementation" of the present principles, as well as other variations thereof, mean that a particular feature, structure, characteristic, and so forth described in connection with the embodiment is included in at least one embodiment of the present principles. Thus, the appearances of the phrase "in one embodiment" or "in an embodiment" or "in one implementation" or "in an implementation", as well any other variations, appearing in various places throughout the specification are not necessarily all referring to the same embodiment.

The implementations described herein may be implemented in, for example, a method or a process, an apparatus, a software program, a data stream, or a signal. Even if only discussed in the context of a single form of implementation (for example, discussed only as a method), the implementation of features discussed may also be implemented in other forms (for example, an apparatus or program). An apparatus may be implemented in, for example, appropriate hardware, software, and firmware. The methods may be implemented in, for example, an apparatus such as, for example, a processor, which refers to processing devices in general, including, for example, a computer, a microprocessor, an integrated circuit, or a programmable logic device. Processors also include communication devices, such as, for example, computers, cell phones, portable/personal digital assistants ("PDAs"), and other devices that facilitate communication of information between end-users.

Implementations of the various processes and features described herein may be embodied in a variety of different equipment or applications. Examples of such equipment include a web server, a laptop, a personal computer, a cell phone, a PDA, and other communication devices. As should be clear, the equipment may be mobile and even installed in a mobile vehicle.

Additionally, the methods may be implemented by instructions being performed by a processor, and such instructions (and/or data values produced by an implementation) may be stored on a processor-readable medium such as, for example, an integrated circuit, a software carrier or other storage device such as, for example, a hard disk, a compact diskette, a random access memory ("RAM"), or a read-only memory ("ROM"). The instructions may form an application program tangibly embodied on a processor-readable medium. Instructions may be, for example, in hardware, firmware, software, or a combination. Instructions may be found in, for example, an operating system, a separate application, or a combination of the two. A processor may be characterized, therefore, as, for example, both a device configured to carry out a process and a device that includes a processor-readable medium (such as a storage device) having instructions for carrying out a process. Further, a processor-readable medium may store, in addition to or in lieu of instructions, data values produced by an implementation.

As will be evident to one of skill in the art, implementations may use all or part of the approaches described herein. The implementations may include, for example, instructions for performing a method, or data produced by one of the described embodiments.

A number of implementations have been described. Nevertheless, it will be understood that various modifications may be made. For example, elements of different implementations may be combined, supplemented, modified, or removed to produce other implementations. Additionally, one of ordinary skill will understand that other structures and processes may be substituted for those disclosed and the resulting implementations will perform at least substantially the same function(s), in at least substantially the same way(s), to achieve at least substantially the same result(s) as the implementations disclosed. Accordingly, these and other implementations are contemplated by this disclosure and are within the scope of this disclosure.

The invention claimed is:

1. A method for channel scanning by a device seeking enablement within a wireless network, comprising:
   determining whether a broadcast information signal received by the device is indicative of a narrowband pilot signal being sent from an enabling device in the network;
   extracting said narrowband pilot signal, from a predetermined portion of spectrum, in response to the broadcast information signal indication;
   using information from the narrowband pilot signal to determine whether to send to the enabling device a request for enablement of the device on the network.

2. The method of claim 1, wherein the device operates in TV white space.

3. The method of claim 1, wherein the broadcast information signal is an IEEE 802.11 public action frame.

4. The method of claim 1, wherein the narrowband pilot signal is contained within a 5 MHz spectrum.

5. The method of claim 1, wherein said information from the narrowband pilot signal comprises utilization level of an access point.

6. The method of claim 1, wherein said determination whether to seek to become enabled on the network is made to optimize network throughput.

7. An apparatus for channel scanning by a device seeking enablement within a wireless network, comprising:
   a comparator for determining whether a broadcast information signal received by the device is indicative of a narrowband pilot signal being sent from an enabling device in the network;
   an extractor for extracting said narrowband pilot signal from a predetermined portion of spectrum in response to the broadcast information signal indication;
   a decision circuit for using information from the narrowband pilot signal to determine whether to send to the enabling device a request for enablement of the device on the network.

8. The apparatus of claim 7, wherein the device operates in TV white space.

9. The apparatus of claim 7, wherein the broadcast information signal is an IEEE 802.11 public action frame.

10. The apparatus of claim 7, wherein the narrowband pilot signal is contained within a 5 MHz spectrum.

11. The apparatus of claim 7, wherein said information from the narrowband pilot signal comprises utilization of an access point.

12. The apparatus of claim 7, wherein said determination whether to seek to become enabled on the network is made to optimize network throughput.

* * * * *